July 20, 1926.

M. S. HOLLIDAY

PLOW DEVICE

Filed June 5, 1925

INVENTOR.
M. S. Holliday
BY
Geo. P. Kimmel
ATTORNEY

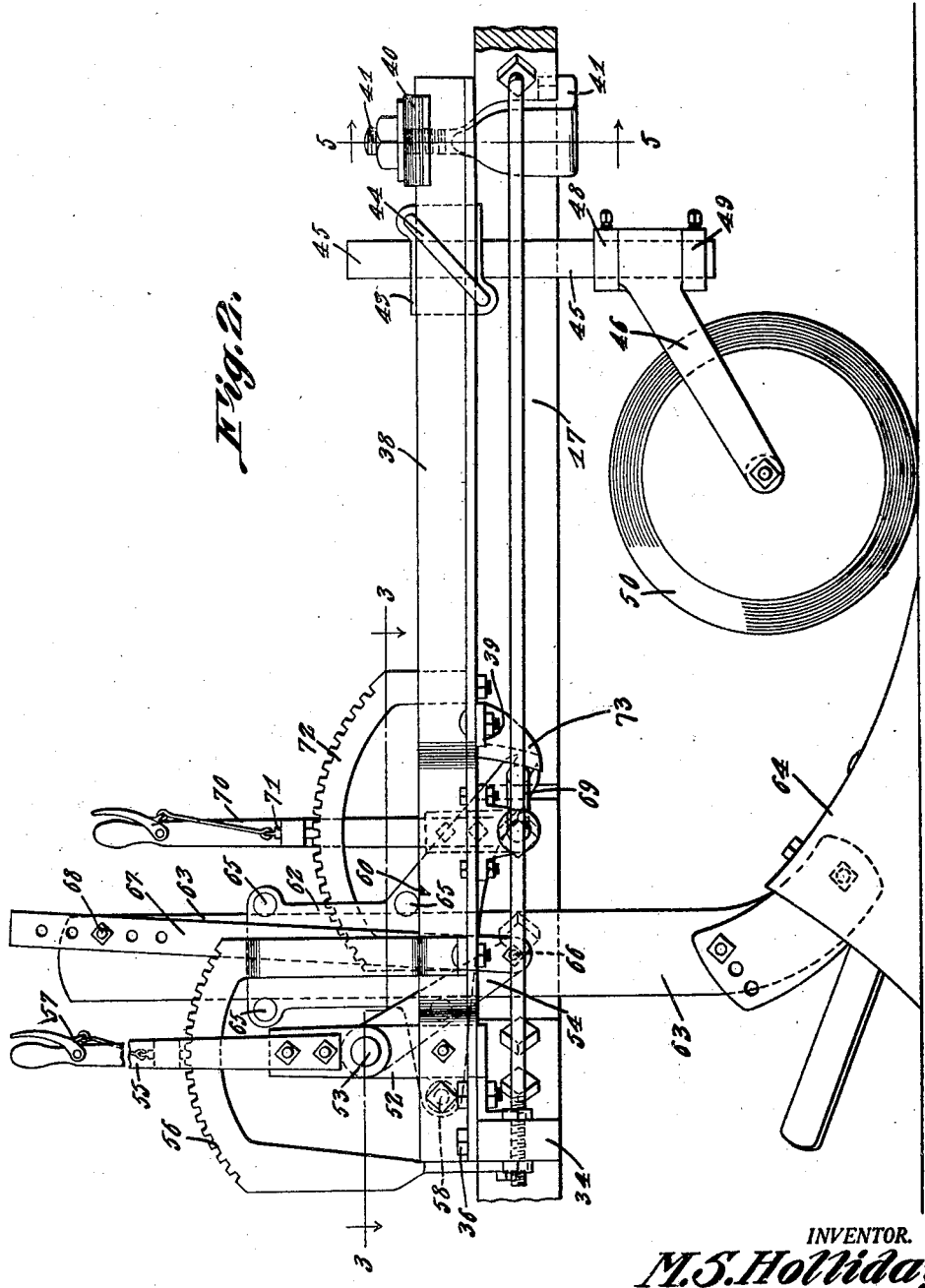

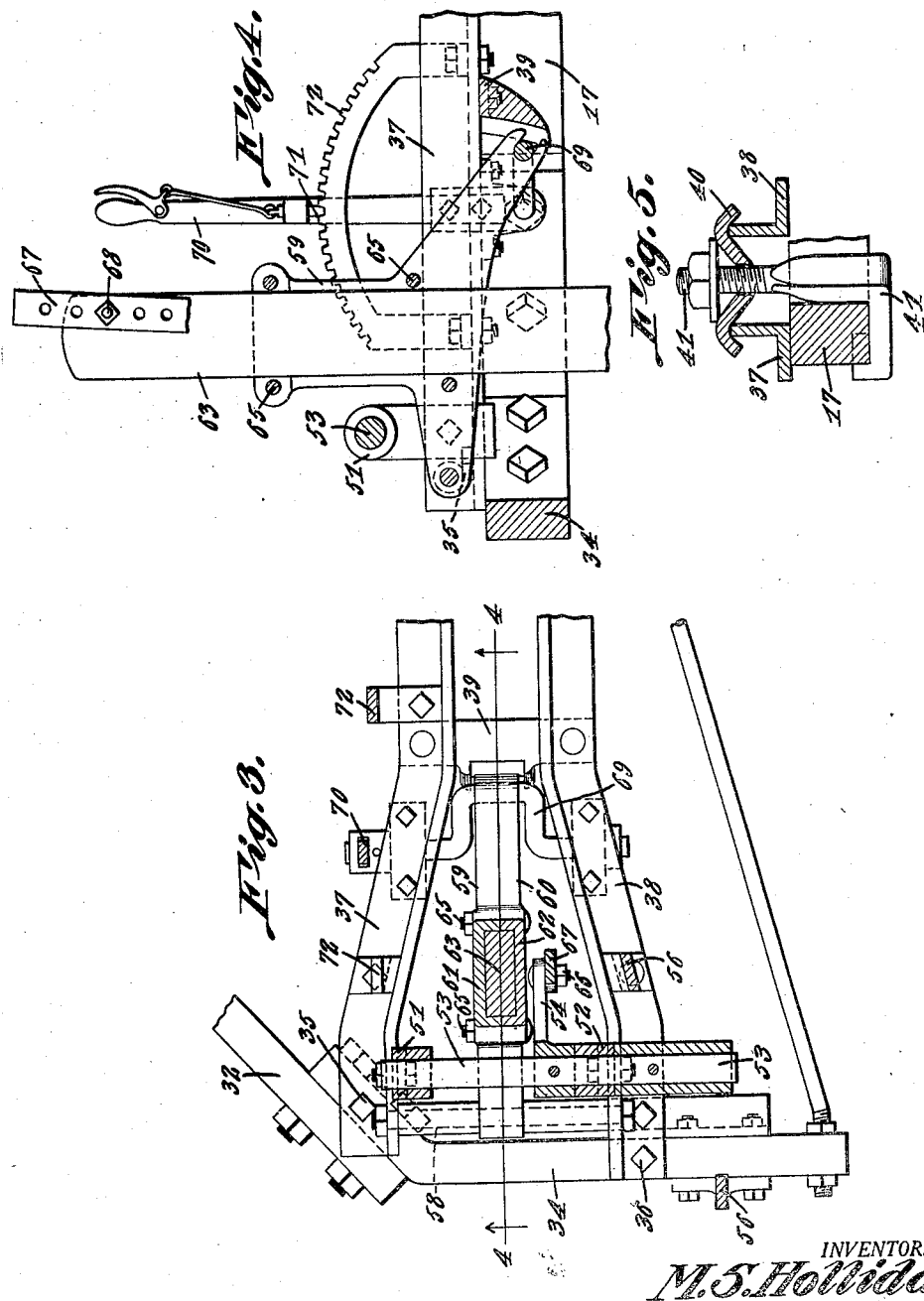

Patented July 20, 1926.

1,593,454

UNITED STATES PATENT OFFICE.

MAY S. HOLLIDAY, OF TAYLOR, TEXAS.

PLOW DEVICE.

Application filed June 5, 1925. Serial No. 35,137.

This invention relates to plows, and has for one of its objects to provide an apparatus combining a side disk plow and a buster or sweep device in coactive relation.

Another object of the invention is to provide a device of this character including a supporting framework for a buster or sweep apparatus, and with means for independently adjusting the sweep or buster devices to control the action.

With these and other objects in view the invention consists in certain novel features of construction as hereinafter shown and described and then specifically pointed out in the claims, and in the drawings illustrative of the preferred embodiment of the invention,—

Figure 2 is a side elevation, enlarged, of a portion of the improved apparatus.

Figure 3 is a plan view enlarged and partly in section of the rear portion of a part of the apparatus.

Figure 4 is a section on the line 4—4 of Figure 3.

Figure 5 is a sectional detail of the coupling between the beam of the disk plow and the beams of the buster or sweep elements, illustrating the construction.

Figure 1:
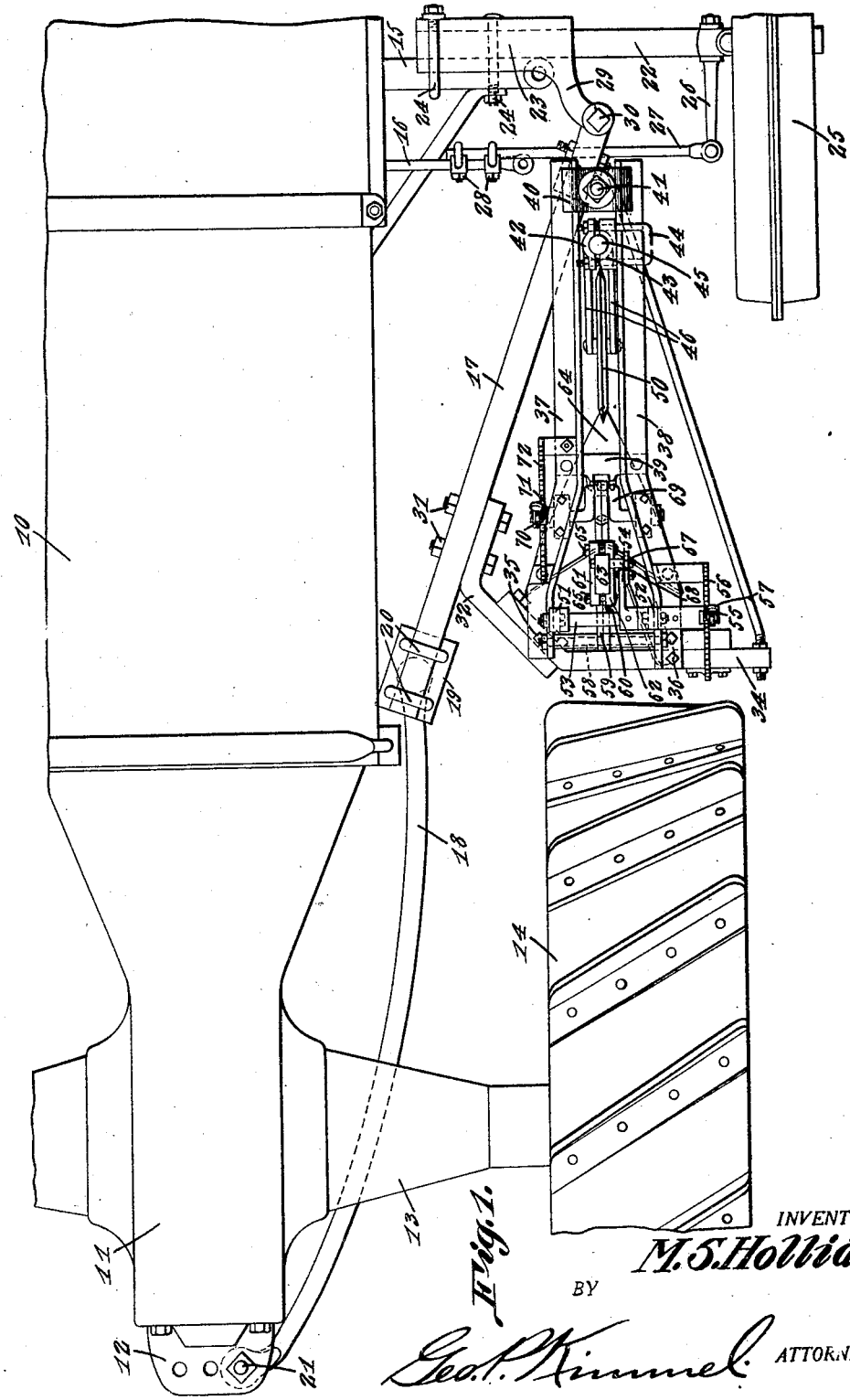
Figure 1 is a plan view of the improved apparatus together with a portion of a conventional tractor with the improved apparatus attached.

The improved apparatus comprises an improved plow supporting mechanism more particularly adapted to be attached to the beam of a disk plow which is in turn attached to a draft apparatus, for instance a tractor device, the improved attachment thus constituting a supplemental or auxiliary plow, but the improved device may be coupled directly to a tractor frame and thus be operated as a main plow.

The improved apparatus comprises a main beam device for supporting a disk plow, and adapted to be coupled to a draft appliance, preferably a motor driven vehicle such as a tractor, and a supplemental beam device for adjustably supporting a sweep or buster plow device and coupled to the main beam.

For the purpose of illustration the improved apparatus is shown associated with a conventional tractor device as shown in Figure 1, 10 representing the fuel tank, 11 the transmission housing having the draw bar cap 12, 13 the rear axle casing, 14 a portion of one of the traction wheels, 15 a portion of the forward axle, and 16 a portion of the connecting rod of the steering mechanism, these parts being of the usual construction.

The improved apparatus includes a main plow beam 17 connected at its rear end to a coupling bar 18 by a plate 19 and spaced U-bolts 20, the rear end of the bar being connected at 21 to the draw bar cap 12.

The forward axle 15 is provided with an extension 22 connected to the axle by a clamp member 23 and clamp bolts 24.

The extension member 22 is provided with a journal to carry one of the forward supporting wheels, a portion of which is shown at 25, and likewise provided with a steering arm 26 to which an extension 27 of the rod 16 is coupled as shown at 28.

By this means the forward wheel 25 is located in advance laterally of the tractor wheel 14, so that the disk plow element 17' carried by the beam 17 will not trail behind the wheel 25.

Extending rearwardly from the clamp member 23 is an arm or bracket 29 to which the forward end of the beam 17 is coupled at 30.

Attached at 31 to the beam 17, is an obliquely directed arm 32 from which a disc plow element may be suspended when desired.

Attached to the arm 32, preferably by the same bolts by which the clamp members 33 are attached, is another arm 34, the latter extending for the major portion of its length at right angles to the line of travel of the tractor, as indicated in Figs. 1 and 3.

Connected at 35 and 36 to the arm 34, are beam members 37 and 38, which for the purpose of this description are referred to as the auxiliary or supplemental beams, to distinguish them from the main beam 17.

The auxiliary beams 37 and 38 are preferably of L bars and converge forwardly and extend for the major portion of their lengths in relatively close parallel relation, and are connected intermediate the ends by a transverse holding plate 39.

At its forward end the member 37 overlaps the main beam 17 and the beam members 37 and 38 are coupled to the main beam by clamp plate 40 and a hook bolt 41.

By this means the auxiliary beams 37 and 38 are firmly supported from the main beam both at front and rear.

Coupled by clamp plates 42 and 43 by a bolt 44 to the auxiliary beam member 38 is a standard 45 having a forked frame 46 mounted to swing between stop collars 48 and 49 thereon and carrying a rolling colter member 50.

Rising from the beam members 37 and 38 at their rear ends are standards 51 and 52 in which a shaft 53 is mounted for oscillation, and connected to move with the shafts is an arm 54 and operating lever 55.

A toothed segment 56 is attached to the beam member 37 and cooperates with a pawl element 57 operatively connected to the lever 55, to provide for holding the shaft 53 and its arm 54 in adjusted position.

Extending through the beam members 37 and 38 at their rear ends is a rod 58, and mounted to swing on the rod is a frame formed of side members 59 and 60 having half bearings 61 and 62 to slidably receive a standard 63 for a plow element 64, the half bearings being united by bolts 65.

Pivoted at 66 to the free end of the arm 54 is an operating bar 67, the latter coupled at 68 at its upper end to the standard 63, the bar 67 having a plurality of spaced apertures to receive the pin 68 to provide means for controlling the throw of the standard to correspondingly control the depth of action of the plow 64.

Mounted for rotation through the members 37 and 38 forwardly of the standard 63 is a crank shaft 69, the forward ends of the frame members 59 and 60 being coupled to the crank of the shaft 69, as shown.

Connected to the crank shaft at one end is an operating lever 70 having a pawl 71 cooperating with a toothed segment 72. By this means the crank shaft may be oscillated and locked in adjusted position, to correspondingly rock the frame 59—60 on the rod 58, and adjust the point of the plow 64 vertically.

Depending from the stay member 39 is a curved guide member 73 in constant contact with which the forward ends of the frame members 59—60 operate to reinforce the frame members and prevent displacement when in operation.

Side disk plows are generally employed for breaking new land which leaves the ground in parallel ridges, and requiring the subsequent action of a sweep or buster device. By the improved apparatus herein shown the sweeping or buster action can be accomplished subsequently to the breaking action, and by employing the same draft appliance. When the disk plow is to be operated, the plow member 64 is elevated into inoperative position by operating the lever 55, and when the plow member is to be operated to level the ridges formed by the disk plow, the latter is detached.

When applied to a tractor device as illustrated in Figure 1, the controlling levers 55 and 70 are within easy reach of the operator of the tractor from his seat, and does not entail any material additional labor or distracting his attention from the operation of the tractor.

The preferred embodiment of the invention is disclosed in the drawings and set forth in the specification but it will be understood that modifications within the scope of the claimed invention may be made in the construction without departing from the principle of the invention or sacrificing any of its advantages.

Having thus described the invention what I claim is:

1. In an apparatus of the class described, a main plow beam adapted to be attached to a draft appliance, auxiliary beam elements, means for coupling the auxiliary beam elements to the main beam, a frame device mounted to swing relative to said auxiliary beam elements and including a vertical guideway, a standard movable in said guideway, a sweep element attached to said standard, a rock shaft carried by said auxiliary beam elements, means for rotating said rock shaft, an arm rotative with said rock shaft, a link connecting said arm at its free end to said standard, and means for swinging said frame relative to said auxiliary beam elements.

2. In an apparatus of the class described, a main plow beam adapted to be attached to a draft appliance, auxiliary beam elements, means for coupling the auxiliary beam elements to the main beam, a frame device mounted to swing relative to said auxiliary beam elements and including a vertical guideway, a standard movable in said guideway, a sweep element attached to said standard, means for adjusting said standard in said guideway, a crank shaft mounted on said auxiliary beam elements, and means for actuating said crank shaft to cause said frame to swing.

3. In an apparatus of the class described, plow beam elements in spaced relation, a transverse member coupled to the rear ends of said beam elements, a rod extending through said beam elements, a frame device swinging upon said rod and formed to set up a guideway intermediate the ends and a slot transversely of one end, a crank shaft mounted on said beam elements and engaging in said transverse slot in said frame, a standard movable in said guideway and carrying a sweep device, means for adjusting said standard in said guideway, and means for actuating said crank shaft to control the position of said frame relative to said rod.

4. In an apparatus of the class described, plow beam elements in spaced relation, a transverse member coupled to the rear ends of said beam elements, a tie member connected to said beam elements intermediate the ends, a rod extending through said beam elements, a frame device swinging upon said rod and formed to set up a guideway intermediate the ends and a slot transversely from one end, a crank shaft mounted on said beam elements and engaging in said transverse slot in said frame, a standard movable in said guideway and carrying a sweep device, means for adjusting said standard in said guideway, means for actuating said crank shaft to control the position of said frame relative to said rod, and a stop element extending from said intermediate stay member and curved to correspond to the path of the free end of the frame.

In testimony whereof, I affix my signature hereto.

MAY S. HOLLIDAY.